United States Patent
Rogers

(10) Patent No.: US 7,364,175 B2
(45) Date of Patent: Apr. 29, 2008

(54) MOTOR VEHICLE SWAY CONTROL ASSEMBLY

(76) Inventor: Robert Rogers, 140 Blackberry Run, Fayetteville, GA (US) 30214

( * ) Notice: Subject to any disclaimer, the term of this patent is extended or adjusted under 35 U.S.C. 154(b) by 0 days.

(21) Appl. No.: 11/715,596

(22) Filed: Mar. 8, 2007

(65) Prior Publication Data
US 2007/0152419 A1    Jul. 5, 2007

Related U.S. Application Data

(63) Continuation of application No. 10/858,321, filed on Jun. 1, 2004, now Pat. No. 7,229,086.

(51) Int. Cl.
*B60G 21/05* (2006.01)
(52) U.S. Cl. ............................. 280/124.106
(58) Field of Classification Search ......... 280/124.106, 280/124.107, 5.502, 5.506, 5.507
See application file for complete search history.

(56) References Cited

U.S. PATENT DOCUMENTS

| | | |
|---|---|---|
| 1,842,418 A | 1/1932 | Mercier |
| 2,094,174 A | 9/1937 | Kittel |
| 3,717,355 A | 2/1973 | De Mars |
| 3,850,445 A | 11/1974 | Burns et al. |
| 3,866,724 A | 2/1975 | Hollnogel |
| 3,917,307 A | 11/1975 | Shoebridge |
| 3,948,567 A | 4/1976 | Kasselmann et al. |
| 4,014,564 A | 3/1977 | Coble |
| 4,046,395 A | 9/1977 | Smith, III |
| 4,079,954 A | 3/1978 | Komarnicki et al. |
| 4,168,844 A | 9/1979 | Smith |
| 4,181,324 A | 1/1980 | Hixon |
| 4,218,072 A | 8/1980 | Wallis |
| 4,262,929 A | 4/1981 | Pierce |

(Continued)

FOREIGN PATENT DOCUMENTS

FR        2 702 709        9/1994

(Continued)

OTHER PUBLICATIONS

Motor Home Magazine, Product Evaluation, Apr. 2004, p. 81-82, Evaluation of Henderson's Trac Bar Kit.

*Primary Examiner*—Faye M. Fleming
(74) *Attorney, Agent, or Firm*—Myers & Kaplan, LLC; George P. Bonanto

(57) ABSTRACT

An improved vehicle sway control assembly designed to limit excessive side swaying of an axle of a vehicle during all driving conditions. The system utilizes two frame brackets (77), (97), one axle/spring bracket (129), and two rods (35), (67). The first rod (35) has one end attached to a frame bracket (77) and the other end to the axle/spring bracket (129). It incorporates a telescoping feature allowing the rod end nearest the frame bracket (77) to telescope. The second rod (67) is attached on the opposite side to a frame bracket (97) on one end and a mid section plate (34) on the telescoping rod (35) on the other end. The counter rotational arch of the second rod (67) will force the telescoping rod (35) to extend thus canceling the telescoping rod (35) arch curve travel if it were a solid rod. The overall design will limit axle (166) to frame (78) side movement while providing near straight vertical axle (166) travel.

19 Claims, 4 Drawing Sheets

U.S. PATENT DOCUMENTS

| | | |
|---|---|---|
| 4,518,171 A | 5/1985 | Hendenberg |
| 4,580,798 A | 4/1986 | Roelofs |
| 4,693,486 A | 9/1987 | Pierce et al. |
| 4,697,817 A | 10/1987 | Jefferson |
| 5,039,124 A | 8/1991 | Widmer |
| 5,527,053 A | 6/1996 | Howard |
| 5,536,028 A | 7/1996 | Howard |
| 6,019,384 A | 2/2000 | Finch |
| 6,349,952 B1 | 2/2002 | Kallstrom |
| 6,523,842 B2 | 2/2003 | Andrews |
| 2002/0005623 A1 | 1/2002 | Andrews |

FOREIGN PATENT DOCUMENTS

| | | |
|---|---|---|
| GB | 2 030 088 A | 4/1980 |

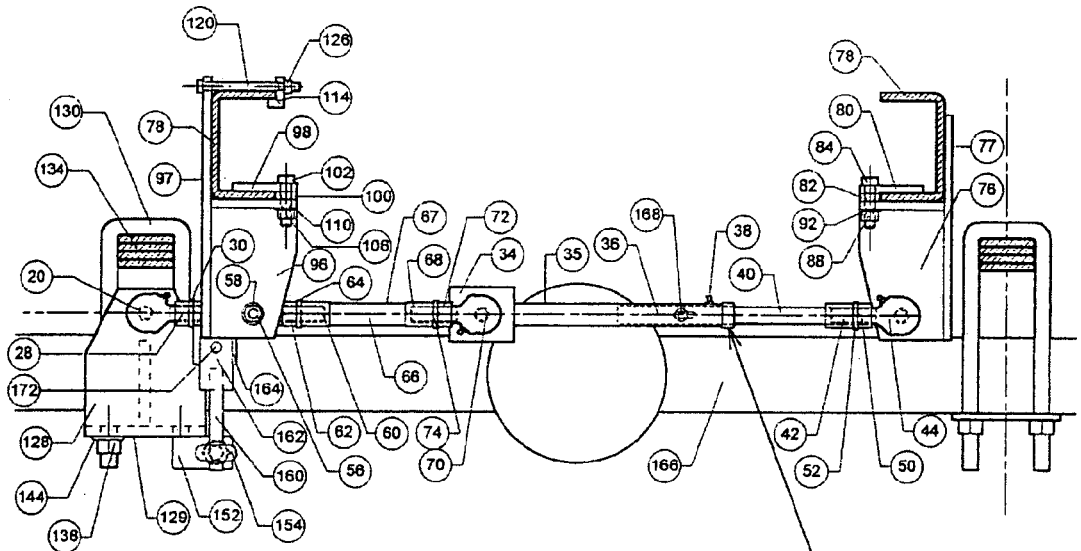
Fig 1
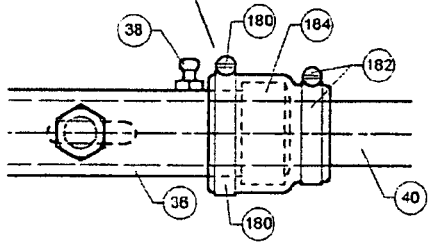
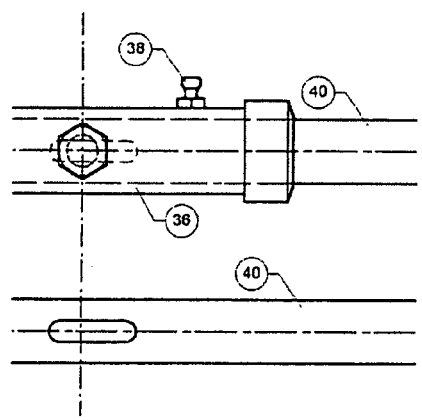
Fig 5
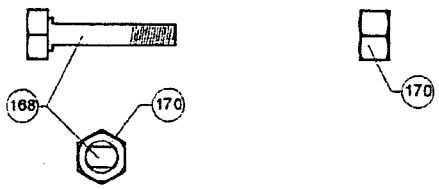

MOTOR VEHICLE SWAY CONTROL ASSEMBLY

RELATED APPLICATIONS

The present Nonprovisional application is a continuation of, and hereby claims priority to, and the benefit of, U.S. patent Nonprovisional application Ser. No. 10/858,321, entitled "MOTOR VEHICLE SWAY CONTROL ASSEMBLY," filed on Jun. 1, 2004, now U.S. Pat. No. 7,229,086.

FIELD OF THE INVENTION

The invention pertains to a sway control device that will, when installed, greatly reduce unwanted vehicle side to side swaying created by wind, uneven road surfaces, or other passing vehicles when the vehicle is traveling on smooth or bumpy surfaces.

BACKGROUND OF THE INVENTION

Currently most factory produced vehicles have their axle assemblies mounted on coil springs, leaf springs, or air suspension assemblies with roll bars and shock absorbers. These vehicles rely on the rigidity of these parts to eliminate unwanted side to side swaying of the vehicle due to the wind, uneven road surfaces or passing vehicles. In many cases, the overall allowable dimensional clearances between the suspension parts along with the flexing of the spring assemblies, air suspension components, roll bars, and shock absorbers won't keep the vehicle from experiencing notable unwanted side to side swaying. This swaying occurs when the vehicle frame is allowed to move from side to side independent of the axle assembly. In other words, the frame moves from side to side and the axle assembly does not. In many vehicles, especially motor homes, school buses, extended vans, older and/or high-mileage vehicles, the swaying can be extreme enough to produce an unsafe driving condition. This swaying action requires immediate steering corrections by the driver to keep the vehicle going straight down the road; in extreme situations, it requires continuous corrections.

Prior art devices provide a single sway bar design to attempt to correct this condition. An example of this design is shown in FIG. 7. The sway bar assembly has rotational bearing type mounting attachments on each end. The sway bar assembly is attached perpendicular to the vehicle frame by a frame attachment bracket on one end and crosses to the opposite side of the vehicle where it is attached to the axle assembly by an axle or spring attachment bracket on the other end. Published Application No. US 2002/0005623 A1 item 88, U.S. Pat. No. 6,523,842 B2 item 88, or U.S. Pat. No. 5,039,124 item 62 are examples of this design. Unwanted side to side movements are then reduced by the addition of the solid connected sway bar device between the frame and axle assembly. A primary problem with this design, even though it reduces side to side swaying during some driving conditions, is that it actually induces side to side frame to axle movement when the vehicle hits a bump or dip in the road and the axle attachment point rebounds up or down. The side to side frame shifting is caused by the arc curve induced by the single sway bar when it moves up and down. The axle attachment point of the sway bar assembly will rotate in an arc curve around the frame attachment point. This design will force the axle assembly to move away from or toward the frame attachment point as the bar travels up or down on a rotational arc. A graphic example of this movement is shown in FIG. 8. On a typical installation, the side induced movement can be approximately three thirty seconds of an inch on an axle that rebounds from its normal riding position up to its maximum allowable height at the frame-mounted axle stop pad. That dimension is approximately one half of the total measured side to side movement of a non sway bar modified stock suspension.

The prior art device actually induces into the vehicle what it is intended to correct. It only works to effectively eliminate side sway when rough roads, wind, or passing vehicles are not affecting the vehicle springs up or down. Simply put, it works as designed when the vehicle is traveling down a smooth highway. During severe driving conditions, however, especially on rough roads, and compounded by passing of large vehicles and extreme crosswinds, vehicle drivers experience the most difficult driving challenges. The best vehicle stability possible is needed at that time and the current single sway bar control system fails to meet that requirement. Instead of correcting the problem, it actually induces side to side shifting when the vehicle is experiencing its greatest stability challenges. An improved sway bar design is needed to correct this disadvantage. Improved vehicle safety and operational control of the vehicle is obtainable with the present invention. The present invention greatly reduces the frame side to side movement in relation to the axle while making sure the axle is allowed to freely move up and down perpendicular to the ground without inducing unwanted side movement.

BACKGROUND OF INVENTION—OBJECTS AND ADVANTAGES

Accordingly, several objects and advantages of the present invention are:

(a) to provide a device that is easily installed on any new or used vehicle;

(b) to provide a device that will greatly eliminate unwanted side to side vehicle swaying as currently allowed by many existing vehicle suspension designs;

(c) to provide an improved device that will not induce unwanted side to side vehicle swaying when the axle assembly rebounds up or down due to normal or abnormal driving conditions as does the single sway bar prior art design;

(d) to provide a device that will reduce the unsafe conditions imposed by unwanted vehicle side to side swaying during all driving conditions;

(e) to provide a device that will greatly reduce driver steering corrections imposed by the continuous side to side swaying allowed by some suspension systems; and (f) to reduce driver fatigue caused by the continuous driver steering corrections imposed by the continuous side to side swaying allowed by some suspension systems.

Further advantages are to provide a device that is lightweight, strong, easily-maintainable, and long lasting. All primary moving parts have rubber seals to protect from dirt ingestion. They also have grease nipples to allow continued maintenance. Examples are the rod end attachments and the telescoping rod assembly. The ball rod ends used are commercially available heavy-duty truck front wheel steering tie-rod ends. They are readily available at many automotive parts stores, thus allowing easy replacement of the parts that may experience wear during use. This design also assures minimal unwanted side movement as would be allowed by polyurethane or rubber being used in the construction of the rod end bearings as provided in some prior art designs currently available on the market.

It should be noted that the use of front wheel steering tie-rod ends is not a requirement of the sway bar assembly design. Their use was intended to provide improved maintainability, long lasting, inexpensive, closer tolerance, and readily available replacement parts. Any rod end bearing design, polyurethane, rubber, greaseable, not greaseable, sealed, or unsealed will only affect the assembly's close tolerance control abilities, its manufacturing cost, and its in-use life expectancy. Manufacturing cost and desired rod-end bearing life will ultimately determine the final manufactured design. Correcting the arc curve induced frame to axle side swaying created by prior art single sway bar designs during up and down axle movement is the primary function of the present invention.

SUMMARY OF THE INVENTION

The present invention has for its objective not only to eliminate most of the excessive side to side swaying of some factory stock vehicle suspension systems, but also, and most importantly, to eliminate most of the unwanted side to side vehicle swaying induced by prior art single bar designs as the axle assembly moves vertically toward or away from the vehicle's frame.

DRAWINGS—FIGURES

FIG. 1 shows a view of the present invention looking from the back to the front.

FIG. 5 shows a second torque control assembly.

DRAWINGS—REFERENCE NUMBERS

Figure 2:
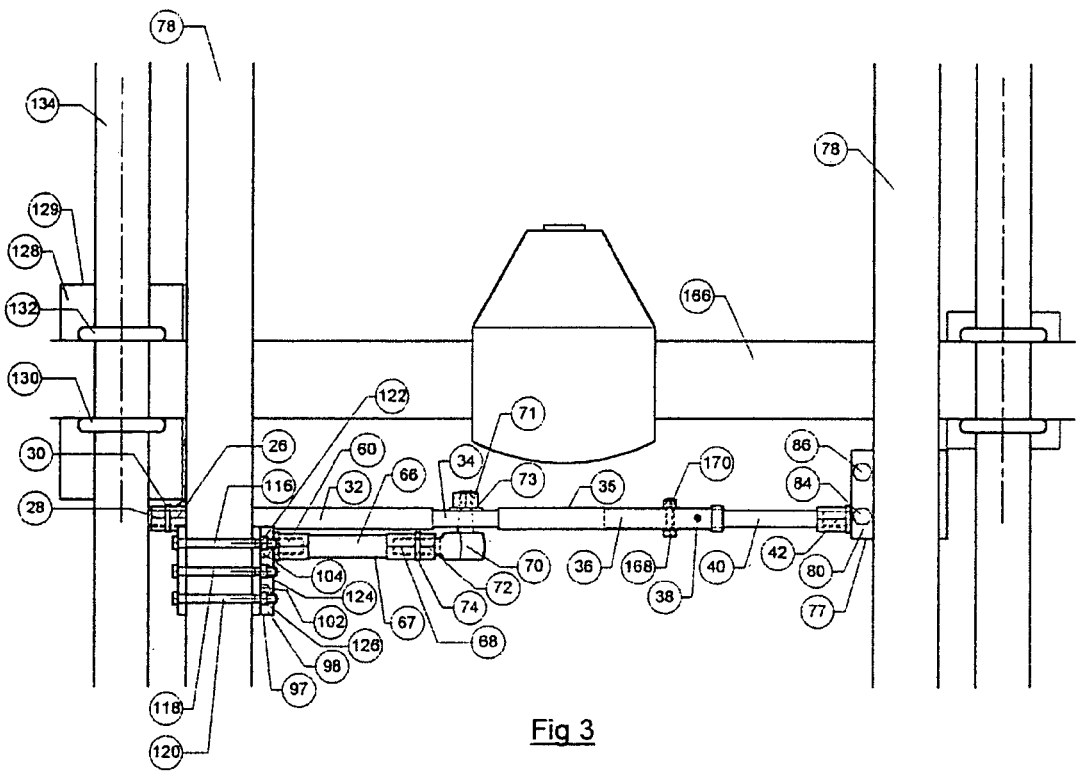
FIG. 2 shows a view of the present invention looking from the top down.
Figure 3:
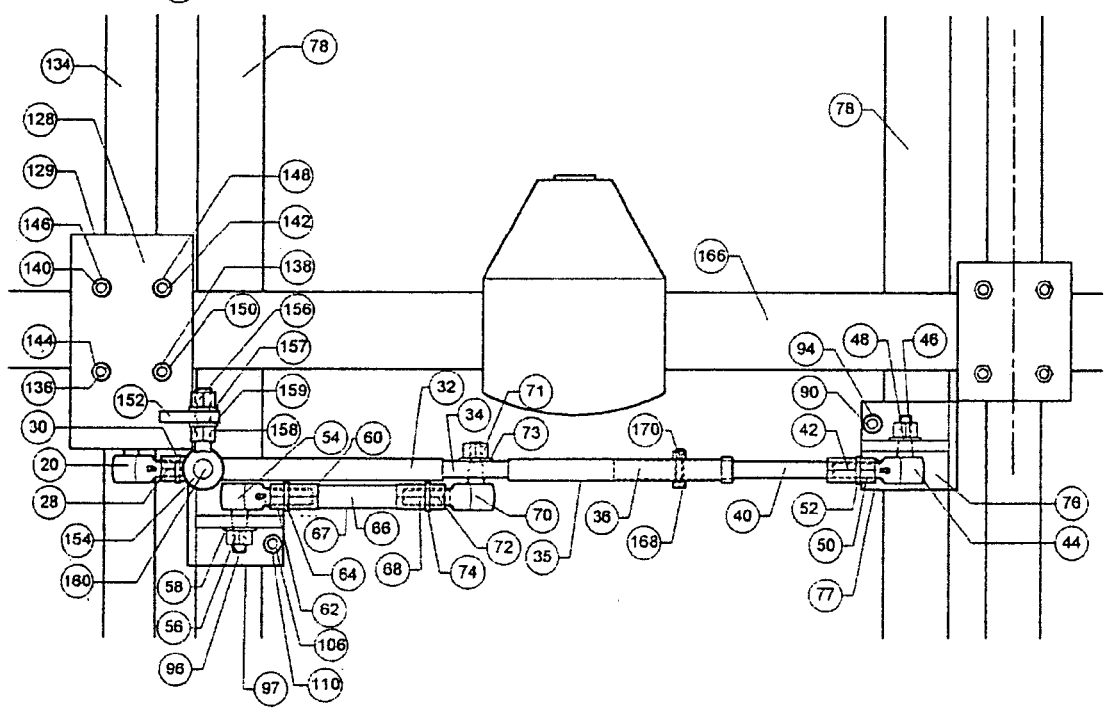
FIG. 3 shows a view of the present invention looking from the bottom up.

| 20 | rod end brng. - rt. thread shaft | 36 | right sway control rod |
| 22 | attachment nut | 38 | grease nipple |
| 24 | locking washer | 40 | telescoping rod |
| 26 | rod end attachment - rt. threads | 42 | rod end attachment |
| 28 | locking nut | 44 | rod end brng. - rt. threads |
| 30 | locking washer | 46 | attachment nut |
| 32 | left sway control rod | 48 | locking washer |
| 34 | mounting plate | 50 | locking nut |
| 35 | sway control rod assy. | 52 | locking washer |
| 54 | rod end brng. - left thread shaft | 88 | nut |
| 56 | attachment nut | 90 | nut |
| 58 | locking washer | 92 | locking washer |
| 60 | rod end attachment - left threads | 94 | locking washer |
| 62 | locking nut - left threads | 96 | bracket |
| 64 | lock washer | 97 | left frame bracket assy. |
| 66 | vertical control rod | 98 | plate |
| 67 | vertical control rod assy. | 100 | spacer |
| 68 | rod end attachment - rt. threads | 102 | bolt |
| 70 | rod end brng. - rt. threads | 104 | bolt |
| 71 | attachment nut | 106 | nut |
| 72 | locking nut | 108 | nut |

-continued

| 73 | locking washer | 110 | locking washer |
| 74 | locking washer | 112 | locking washer |
| 76 | bracket | 114 | bracket |
| 77 | rt. frame bracket assy. | 116 | bolt |
| 78 | frame assy. | 118 | bolt |
| 80 | plate | 120 | bolt |
| 82 | spacer | 122 | locking nut |
| 84 | bolt | 124 | locking nut |
| 86 | bolt | 126 | locking nut |
| 128 | bracket | 157 | locking washer |
| 129 | axle/spring bracket assy. | 158 | locking nut |
| 130 | U bolt | 159 | locking washer |
| 132 | U bolt | 160 | rod |
| 134 | springs | 162 | yoke |
| 136 | nut | 164 | attachment pad |
| 138 | nut | 166 | axle assembly |
| 140 | nut | 168 | torque bolt |
| 142 | nut | 170 | locking nut |
| 144 | locking washer | 172 | pin |
| 146 | locking washer | 174 | cotter pin |
| 148 | locking washer | 176 | foam dust cover |
| 150 | locking washer | 178 | dust cover cap |
| 152 | pad | 180 | hose clamp |
| 154 | threaded shaft rod end brng. | 182 | hose clamp |
| 156 | locking nut | 184 | grease seal cover |

DETAILED DESCRIPTION OF THE INVENTION

A preferred embodiment of the sway bar invention is illustrated in FIGS. 1, 2, 3, 4, and 5. The sway control rod assembly 35 is a welded, machined, and/or bolted assembly. It is preferably manufactured from steel pipe stock, steel plate stock, inside diameter threaded steel hexagon bar stock, steel rod stock, rod end bearing assemblies, nuts, and/or locking washers. Starting at the left side of the assembly and going right the detail parts preferably include a rod end bearing 20, attachment nut 22 (not shown), and locking washer 24 (not shown). Rod end bearing 20, its attachment nut 22 (not shown) and locking washer 24 (not shown) are preferably threaded into hexagon rod end attachment 26 and locked in position by locking nut 28 and locking washer 30. Hexagon rod end attachment 26 is preferably welded to left sway control rod 32. A mounting plate 34 is preferably welded to left sway control rod 32. Mounting plate 34 preferably has a machined hole in its center position. The hole is preferably machined to accept the tie-rod 70 tapered attachment mounting bolt. Mounting plate 34 is preferably welded to the right sway control rod 36 which preferably has a grease nipple 38 installed near the right end. A telescoping rod 40 preferably slides freely in and out of right sway control rod 36. Telescoping rod 40 preferably has a hexagon rod end attachment 42 welded to the right end. Rod end bearing 44, with attachment nut 46 and locking washer 48 are preferably threaded into hexagon rod end attachment 42 and secured in position by locking nut 50 and locking washer 52. The junction of telescoping rod 40 and the right sway control rod 36 are preferably protected from dust and moisture by a grease seal cover 184 and secured in place by two hose clamps 180 and 182.

The vertical control rod assembly 67 is preferably a welded, machined, and/or bolted assembly. It is preferably manufactured from steel pipe stock, inside diameter threaded hexagon bar stock, nuts, locking washers, and/or rod end bearing assemblies. The assembly instructions start at the left side and progress to the right. The detail parts preferably include a left-hand threaded rod end bearing 54, attachment nut 56, and locking washer 58. Rod end bearing 54, its attachment nut 56, and locking washer 58 are preferably threaded into a left-hand threaded hexagon rod end attachment 60 and locked in position by a left-hand threaded locking nut 62 and locking washer 64. The rod end hexagon attachment 60 is preferably welded to a vertical control rod 66. The vertical control rod 66 is preferably welded to right-hand threaded hexagon rod end attachment 68. Rod end bearing 70, its attachment nut 71, and locking washer 73 are preferably threaded into hexagon rod end attachment 68 and secured by locking nut 72 and locking washer 74.

The right frame bracket assembly 77 is preferably a welded, machined, and/or bolted assembly. The assembly material is preferably steel plate stock, nuts, bolts, and/or locking washers. Bracket 76 preferably has a hole machined in its section, which is preferably perpendicular to the frame assembly 78 to accept the tapered attachment bolt from rod end bearing 44. Bracket 76 is preferably secured to the frame assembly 78 by sandwiching the frame assembly 78 between the bracket 76 and plate 80. The spacer 82 is preferably installed between the bracket 76 and plate 80 to assure bracket 76 is securely retained in its intended position. Bolts 84, 86, nuts 88, 90, locking washers 92, and 94 preferably secure plate 80, spacer 82, and bracket 76 to the frame assembly 78.

The left frame bracket assembly 97 is preferably a welded, machined, and/or bolted assembly. It is preferably manufactured from welded plate, bolts, nuts, and/or locking washers. Bracket 96 preferably has a hole machined in its section, which is preferably perpendicular to the frame assembly 78 to accept the tapered attachment bolt from rod end bearing 54. The bracket 96 is preferably secured to the frame assembly 78 on the bottom by sandwiching the frame assembly 78 between the bracket 96 and plate 98. A spacer 100 is preferably installed between the bracket 96 and plate 98 to assure bracket 96 is securely retained in its intended position. Bolts 102, 104, nuts 106, 108 (not shown), and locking washers 110, 112 (not shown) preferably secure plate 98, spacer 100, and bracket 96 to frame assembly 78. Bracket 114 is preferably attached to bracket 96 across the top section of the frame assembly 78 by installing bolts 116,118,120, and locking nuts 122,124,126. The axle/spring bracket assembly 129 is preferably a welded and/or machined assembly manufactured from steel plate stock. Holes are preferably drilled in bracket 128, the horizontal plate section, to match the four threaded end positions of the spring assembly U bolts 130 and 132.

The vertical section of the bracket 128 preferably has a hole machined to accept the tapered attachment bolt of rod end bearing 20. The assembly is preferably attached to the bottom of the left side spring assembly 134 using the existing or extended, if needed, U-bolt 130 and 132. The existing U-bolts 130 and 132, axle assembly 166 to spring assembly 134, retention nuts are left installed. The bracket 128 is preferably installed up against the existing U bolt 130 and 132 nuts using mounting nuts 136, 138, 140, 142, and locking washers 144, 146, 148, 150 underneath to secure the bracket 128 to the spring assembly 134 bottom side.

Figure 4:
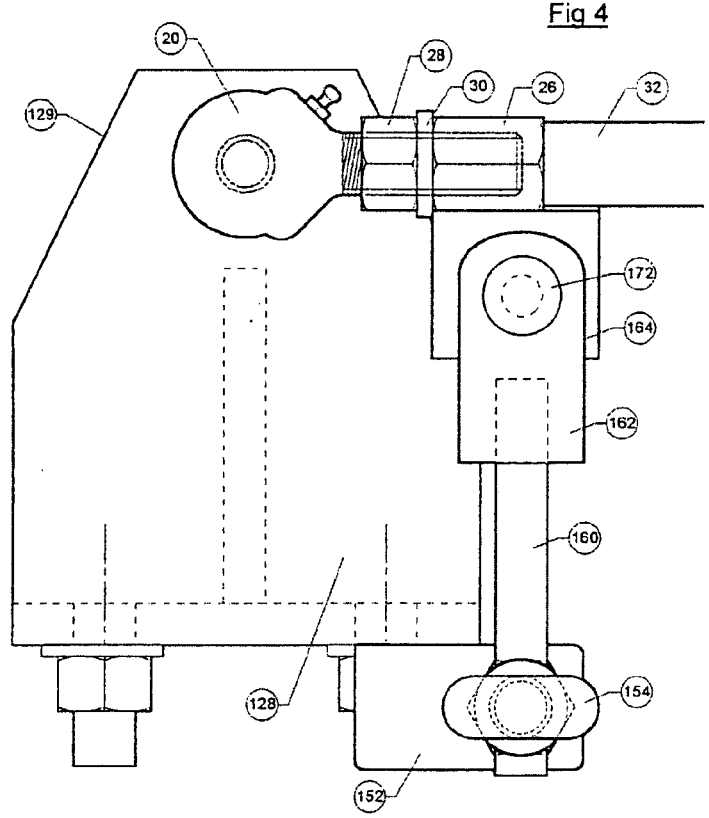
FIG. 4 shows a view of the torque control assembly.
Figure 4:
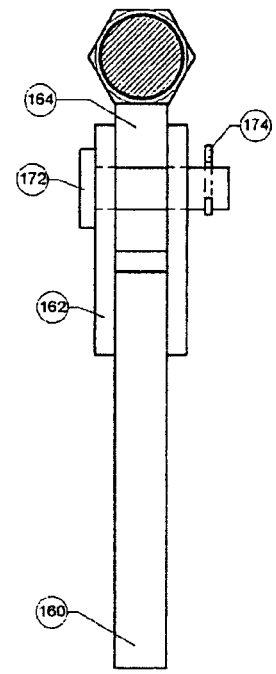
Figure 4:
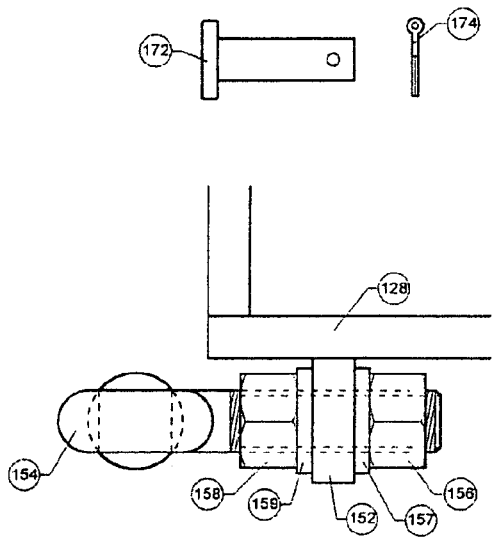
Figure 4:
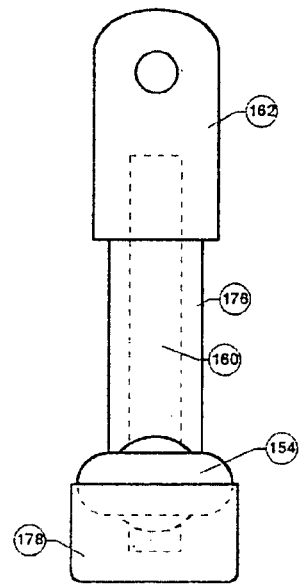

An exploded view of the torque control assembly is shown in FIG. 4. During operational use, the vehicle's sway induction forces will apply loads to the vertical control rod assembly 67 and sway control rod assembly 35. When the rod assemblies 67 and 35 are not parallel, the forces will induce rotational loads to the rod end bearings 20, 44, 54, and 70. Their design will allow the rod assembly 35 to rotate. This is accomplished by the rod end bearings 20, 44, 54, and 70 outer bearing races rotating on their inside ball bearings. This rotation will induce unwanted dimensional changes in the assemblies thus eliminating the desired sway control function of the assembly. The torque control assembly, FIG. 4 is preferably designed to eliminate the rotational movement of the sway control rod assembly 35 while allowing free unrestrained up and down movement of the assembly. The torque control assembly, FIG. 4 is preferably a welded, machined, and/or bolted assembly. It is preferably manufactured from plate stock, rod stock, nuts, lock washers, and/or a threaded rod end bearing. The torque control assembly, FIG. 4, preferably links the sway control rod assembly 35 to the axle/spring bracket assembly 129. This preferably eliminates the torque rotational reaction on rod end bearings 20, 54, and 70. Torque control assembly mounting pad 152 is preferably welded to bracket 128. Torque control pad 152 preferably has a hole drilled in it to accept the threaded shaft rod end bearing 154. The threaded end of the threaded shaft rod end bearing 154 is preferably inserted into the torque pad 152 hole and secured by locking nuts 156, 158, and locking washers 157 and 159. Rod 160 is preferably installed in the threaded shaft rod end bearing 154 hole. Rod 160 is preferably welded to a yoke 162. Yoke 162 preferably has a hole drilled in both sides of the yoke 162 which matches the hole drilled in attachment pad 164. A pin 172 is preferably installed through the yoke 162 holes and attachment pad 164 hole thus securing the two parts. Cotter pin 174 is preferably inserted and secured in pin 172 to assure the pin 172 is retained in the assembly. Attachment pad 164 is preferably welded to the bottom left side of rod end attachment 26 and left sway control rod 32. This now preferably secures the rotational forces exerted on the sway control rod assembly 35 to the solid mounted axle/spring bracket assembly 129. Rod end bearing 20, 54, and 70 will now preferably not rotate. The sliding action of rod 160 into the threaded shaft rod end bearing 154 along with the exposed ball end bearing of the threaded shaft rod end bearing 154 is preferably protected from dust by a foam dust cover 176 and a dust cover cap 178.

FIG. 5 identifies the second torque control requirement. It preferably incorporates a torque bolt 168 with both sides machined flat to increase its wear surface. The torque bolt 168 is preferably installed through a round hole drilled in rod 36, through a loose fit horizontal slotted hole machined in telescoping rod 40 and through an opposite side slotted hole in rod 36. The torque bolt 168 is preferably retained in place by a locking nut 170. Torque bolt 168 then preferably transfers any twisting action of telescoping rod 40 and rod end bearing 44 to the secured sway control rod assembly 35 as previously outlined in FIG. 4. The horizontal slot in telescoping rod 40 will then preferably allow telescoping rod 40 to side in and out of the right sway control rod 36. This now preferably assures rod end bearing 44 does not rotate on its ball allowing unwanted movement in the assembly.

It should be noted that either of the frame assembly 78 bracket assemblies 77 or 97 may be directly welded to the frame assembly 78 versus bolted as described above. The bolted procedure described was intended to provide a means of assembly that would not require the availability of a suitable welding machine.

Installed Description

The axle/spring bracket assembly 129 is preferably installed with the tapered hole mounting plate up and to the rear of the vehicle. It is preferably attached under spring assembly 134 using the existing or extended, if required, U-bolts 130 and 132. Nuts 136,138,140,142, and locking washers 144, 146, 148,150 are preferably used to secure bracket assembly 129. The right frame bracket assembly 77 is preferably attached to the right side frame assembly 78.

Bracket 76 is preferably secured to the frame assembly 78 by sandwiching the frame assembly 78 between the bracket 76 and plate 80. Spacer 82 is preferably installed between the bracket 76 and plate 80. The rod end bearing hole attachment plate on bracket 76 is preferably installed perpendicular directly across from the tie-rod mounting hole plate face of bracket 128. Attachment bolts 84, 86, lock washers 92, 94, and nuts 88, 90 preferably secure the assembly.

The left frame bracket assembly 97 is preferably attached on the left side frame assembly 78 approximately three and one half inches more to the rear of the vehicle from axle assembly 166 than bracket assembly 77 was installed on the right side frame assembly 78. Bracket 96 is preferably secured to the frame assembly 78 on the bottom by sandwiching the frame assembly 78 between the bracket 96 and plate 98. Spacer 100 is preferably installed between the bracket 96 and plate 98. Bolts 102, 104, nuts 106,108 (not shown), and lock washers 110,112 (not shown) are preferably used to secure plate 98, spacer 100, and bracket 96 to the frame assembly 78. Bracket 114 is preferably attached to bracket 96 across the top section of the frame assembly 78 by bolts 116,118,120, and locking nuts 122,124,126.

The tapered bolt on rod end bearing 44 of sway control rod assembly 35 is preferably inserted into the machined-tapered hole in bracket 76 and secured in position by nut 46 and locking washer 48. Locking nut 50 is preferably tight and correctly adjusted as received. Locking nut 50 and locking washer 52 preferably locks rod end bearing 44 securely to rod end attachment 42. The tapered bolt on rod end bearing 20 is preferably inserted into the machined-tapered hole in bracket 128 and secured in position by attachment nut 22 (not shown) and lock washer 24 (not shown). Locking nut 28 is preferably tight and correctly adjusted, as received. Locking nut 28 and locking washer 30 preferably locks rod end bearing 20 securely to rod end attachment 26.

The tapered bolt on rod end bearing 54, of vertical control rod assembly 67 is preferably installed into the machined-tapered hole on bracket 96 and secured by nut 56 and locking washer 58. Locking nuts 72 and 62 are preferably loose. The tapered bolt on rod end bearing 70 is preferably installed into the machined-tapered hole in mounting plate 34 and secured with attachment nut 71 and locking washer 73. Vertical control rod 66 requires twisting clockwise or counter-clockwise to allow the tapered bolt on rod end bearing 70 to perpendicularly enter the center of the hole on plate 34.

The sway control assembly was designed to be installed with the vehicle at its normal at rest position. Since not all frames and springs will be at the same position, minor adjustments may be required on most installations. Proper installation requires the sway control rod assembly 35 and the vertical control rod assembly 67 to preferably be parallel with each other prior to tightening locking nuts 62 and 72. The lowest to the ground of the three following rod end bearings 20, 54 or 44 must preferably be raised at their frame or axle positions so the two rod assemblies, 67 and 35 are parallel. After the two rod assemblies are parallel the vertical control rod 66 was preferably twisted to find its true center position. That is when it is not loaded either in or out by the installation. Rod 66 will preferably easily rotate a small amount clockwise or counter clockwise at that position. When this adjustment is achieved, locking nuts 62 and 72 are preferably secured while making sure control rod 66 does not rotate. The sway control assembly is then ready for use.

NOTE: The sway control assembly is installed as shown to document its basic installation function. The sway control assembly could be redesigned and installed in reverse, left to right, of its shown installation and still function as designed.

Operation

Figure 7:
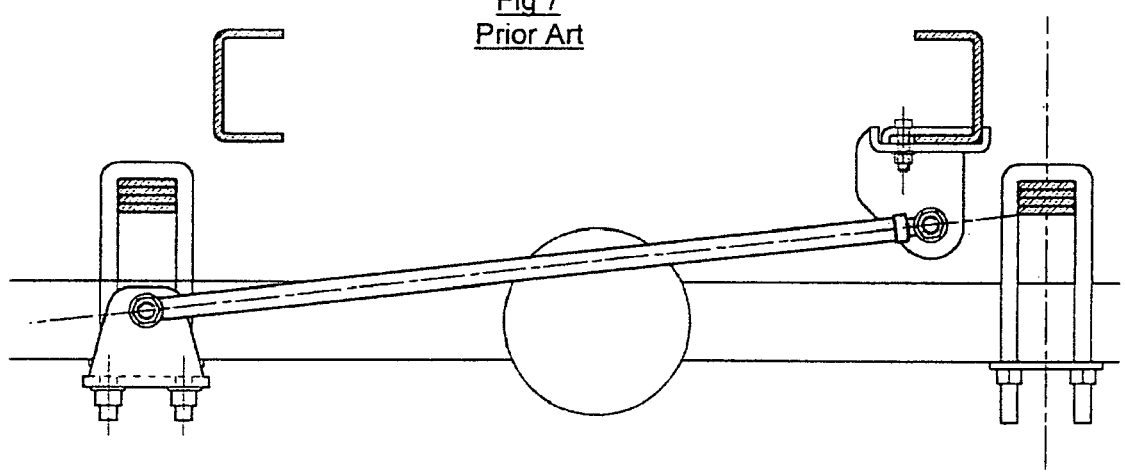
FIG. 7 shows a view of s prior art device.

The unique design feature on this invention, FIGS. 1, 2, 3, 4, and 5, is that it preferably constrains the vehicle frame from swaying side to side when the axle assembly 166 reacts up or down during normal or severe driving conditions. The prior art design, FIG. 7, actually induces side to side movement, FIG. 8, when the axle assembly 166 moves up or down; i.e. the vertical distance between axle assembly 166 and frame assembly 78 changes. The single-bar prior-art designed sway bar, FIG. 7, actually induces, such as on rough roads, approximately fifty percent of the total unwanted sway as compared to measured side to side of an unmodified vehicle.

Figure 8:
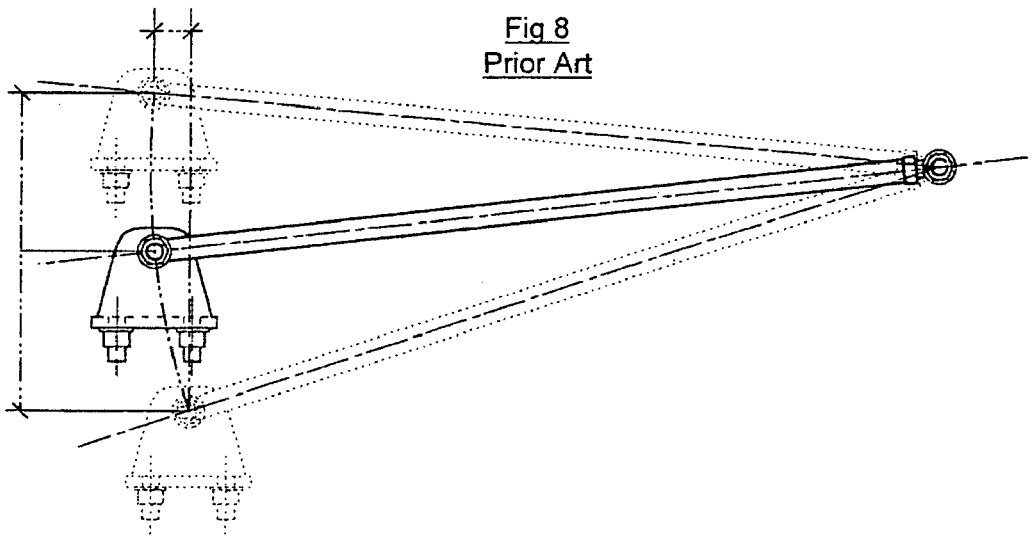
FIG. 8 shows a graphic view of s prior-art sway bar's resultant reaction from an axle up or down movement.

When the axle assembly 166 moves up or down, due to its reaction from driving conditions, spring assembly 134 along with axle/spring attachment bracket assembly 129 and the left side of the sway control rod assembly 35 also move up or down. As the left side of the sway control rod assembly 35 moves up or down telescoping rod 40, supported by right frame bracket assembly 77, preferably telescopes in and out of the right sway control rod 36. This telescoping action preferably eliminates the forced arc curve that a one-piece rod would experience, as shown in FIG. 8. This feature preferably allows axle assembly 166, spring assembly 134 and axle/spring bracket assembly 97 to respond basically straight up and down perpendicular to the ground.

Figure 6:
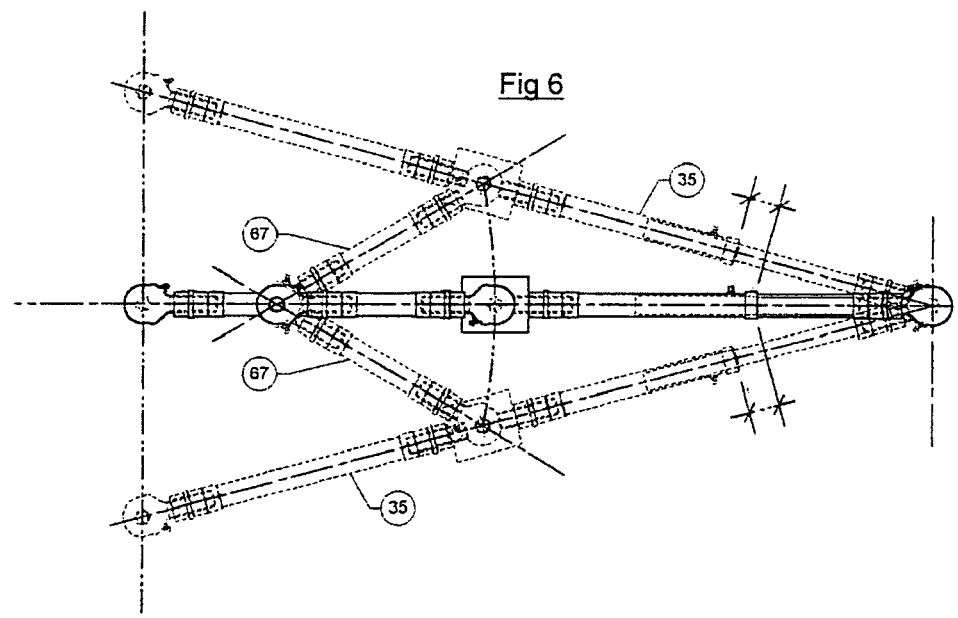
FIG. 6 shows a graphic view of the present invention's sway bar resultant reaction from an axle up or down movement.

Sway control rod assembly 35 preferably rotates around the frame assembly 78 right side frame bracket assembly 77 attachment point. The vertical control rod assembly 67 preferably rotates in a fixed arc around frame assembly 78 mounted left side frame bracket assembly 97 attachment point. As the left side of sway control rod assembly 35 moves up or down, rotating clockwise or counter-clockwise, vertical control rod assembly 67, attached to mounting plate 34 and to frame assembly 78 mounted left side frame bracket assembly 97 will preferably rotate in the opposite direction around frame assembly 78 mounting left side frame bracket assembly 97 attachment point. The counter-rotational movement of the vertical control rod assembly 67 will preferably control the amount of telescopic movement of telescoping rod 40 in or out of right sway control rod 36 of sway control rod assembly 35. In other words, as the two rod assemblies 35 and 67 rotate in opposite directions, vertical control rod assembly 67 will cause the telescoping action of sway control assembly 35 to extend or retract. This controlled extension or retraction will preferably allow axle/spring bracket assembly 129 to travel generally in a straight up or down movement as measured side to side. The designed length of sway control rod assembly 35, its attachment point position at plate 34, and the length of vertical control rod assembly 67 preferably assure that the desired dimensional movement controls are maintained. The movement of axle/spring bracket assembly 129 is preferably now secured to travel straight up or down within a few thousands of an inch as measured from side to side. See FIG. 6 for a graphic view of this action. Any unwanted side to side frame assembly 78 to axle assembly 166 movement is thus almost totally eliminated.

The counter-rotating design of the two rods of the present invention, with the telescoping function, preferably allows the assembly to control side to side frame assembly 78 to axle assembly 166 shifting during all driving conditions. Its design preferably does not induce into the vehicle the unwanted side to side movement, illustrated in FIG. 8, on rough roads as does prior art single bar designs, illustrated in FIG. 7.

FIG. 4 is a detailed view of the torque control design feature. The sway control forces exerted by the vertical control rod assembly 67 as it moves up or down may cause the sway control rod assembly 35 rod end bearing 20, 44, and 70 to twist on their ball ends. The torque control feature, FIG. 4 assures the sway control rod assembly 35 preferably does not rotate resulting in rod end bearing 20 and 70 to rotate on their ball ends. The rotation of the ball assembly would allow unwanted side movement in the assembly that would negate the desired close tolerance side to side controls intended for the total sway control assembly.

FIG. 5 shows the second torque control feature. It shows an exploded view of a bolt 168 with two sides machined flat installed through rod 36 and through a loose fit elongated hole machined in telescoping rod 40. Locking nut 170 preferably secures torque bolt 168 in place. Since the right sway control rod assembly 35 has preferably been secured from rotation by the design shown in FIG. 4, torque bolt 168 will then preferably restrict any turning action of telescoping rod 40 while allowing the desired telescoping action of telescoping rod 40 in and out of the right sway control rod 36. This assures rod end bearing 44 does not rotate on its ball allowing unwanted side movement in the assembly that would negate the designed close tolerance side to side control of the side sway control assembly.

It is noted that the frame bracket assemblies 77 and 97 along with the axle/spring bracket assembly 129, as drawn, may require modifications from their as shown design to adapt to the various vehicle frame assembly and axle/spring assembly designs on the market. The intent was to illustrate their functional use according to the preferred design of the present invention.

It is further noted that if polyurethane or rubber bushings mounted in a steel ring with solid mounting bolts, steel sleeves, and flat washers were used, the assembly would not need any of the torque design features shown in FIG. 4 and FIG. 5. Such an embodiment would give up some unwanted side to side movement due to the elasticity of the bearings but the assembly would provide much improved frame side movement in relation to the axle assembly on rough roads over the previous prior art single bar designs. Manufacturing cost and resultant profits may ultimately dictate these manufacturing decisions, but do not remove the device from the scope of the present invention.

The present invention has been described herein using selected language to describe the structural features. It should be understood, however, that the invention is not limited to the specific features shown, or the particular language so selected, since the means and construction shown comprise only some of the embodiments within the scope of the present invention. The invention is, therefore, limited only by the following claims, interpreted in accordance with the doctrine of equivalents.

What is claimed is:

1. A sway control apparatus comprising:
a sway control rod assembly comprising a sway control rod having a telescoping section disposed proximate a distal end thereof, a first and second rotating bearing-type attachment device disposed on opposite ends thereof, and including a mounting plate disposed proximate a medial portion thereof, said mounting plate adapted to connect to a third rotating bearing-type attachment device, said sway control rod assembly attached by said first rotating bearing type attachment device at a proximal end to an axle spring assembly of a vehicle and to a frame of said vehicle by said second rotating bearing attachment device at a distal end thereof; and
a vertical control rod assembly having a third and a fourth rotating bearing-type attachment devices on opposite ends thereof with said fourth rotating bearing type device attached to said frame of said vehicle, and said fourth rotating bearing type attachment device attached to said mounting plate of said sway control rod assembly.

2. A vehicle sway control assembly comprising:
a first rod; and
a second rod, said second rod rotatably connected to said first rod proximate a medial portion of said first rod.

3. The vehicle sway control assembly of claim 2, wherein said second rod is offset from said first rod a distance along an axis of rotation thereof such that said second rod is capable of rotating through a zero degree angle relative to said first rod.

4. The vehicle sway control assembly of claim 2, further including a torque control assembly, said torque control assembly preventing rotation of said first rod about a longitudinal axis thereof.

5. The vehicle sway control assembly of claim 4, wherein said torque control assembly prevents rotation of said first rod about said longitudinal axis thereof by counteracting a torque applied to said first rod by said second rod due to said offset.

6. The vehicle sway control assembly of claim 2, wherein a first end of said first rod is rotatably attached to a suspension element of a vehicle and a second end of said first rod is rotatably attached to a first portion of a frame carried by said vehicle, and wherein a length of said first rod is adjustable, said length being a distance between an attachment point with said suspension element and an attachment point with said first portion of said frame.

7. The vehicle sway control assembly of claim 6, wherein a second end of said second rod is rotatably connected to a second portion of said frame, said second portion of said frame being spaced from said first portion of said frame.

8. The vehicle sway control assembly of claim 7, wherein vertical travel of said suspension element causes a change in a length of said first rod, whereby said vertical travel of said suspension element does not cause a substantial lateral movement of said frame.

9. The vehicle sway control assembly of claim 2, wherein a length from a first connection point to a second connection point is fixed, said first connection point being a connection point of said second rod to said second portion of said frame and said second connection point being a connection point of said first end of said second rod to said first rod, and wherein a length from a third connection point to said second connection point is fixed, said third connection point being a connection point of said first end of said first rod to said suspension element of said vehicle.

10. The vehicle sway control assembly of claim 6, wherein said first rod further comprises a telescoping section, and wherein said length of said first rod is adjustable due to a telescoping movement of said telescoping section.

11. The vehicle sway control assembly of claim 2, wherein at least one of said first end of said second rod and said medial portion of said first rod further comprises a rotating bearing type attachment device connecting said second rod to said first rod.

12. The vehicle sway control assembly of claim 6, further comprising at least one bushing and washer assembly, said bushing and washer assembly preventing rotation of said first bar about a longitudinal axis thereof.

13. The vehicle sway control assembly of claim 7, further comprising a plurality of brackets configured to enable said motor vehicle sway control assembly to be operably connected to said suspension element, said first portion of said frame, and said second portion of said frame.

14. The vehicle sway control assembly of claim 6, wherein said suspension element is selected from the group consisting of a front suspension element, a rear suspension element, a coil spring suspension element, a leaf spring suspension element, and an air suspension element.

15. The vehicle sway control assembly of claim 7, wherein said second portion of said frame is one of in front of a connection point between said first rod and said suspension element and in back of a connection point between said first rod and said suspension element.

16. The vehicle sway control assembly of claim 2, wherein said first rod further comprises a first connection point on a first end thereof and a second connection point on a second end thereof, said first connection point and said second connection point being adapted to attach to at least one of a vehicle suspension element, a vehicle frame, a vehicle suspension mounting bracket, and a frame mounting bracket.

17. The vehicle sway control assembly of claim 2, wherein said first rod includes a length from a first end thereof to a second end thereof, said length being adjustable.

18. The vehicle sway control assembly of claim 17, wherein a length of said first rod between a first end thereof and said medial portion is fixed.

19. The vehicle sway control assembly of claim 9, wherein vertical travel of said suspension element causes a change in a length of said first rod, whereby said vertical travel of said suspension element does not cause a substantial lateral movement of said frame.

* * * * *